Nov. 8, 1932.   M. A. BUETTELL   1,887,081
COUPLING
Filed Jan. 2, 1932
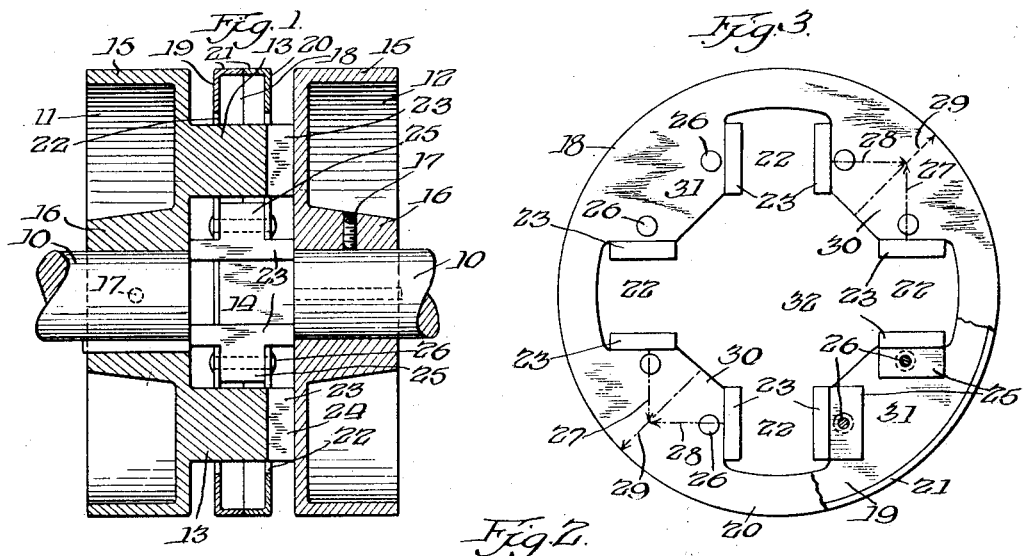
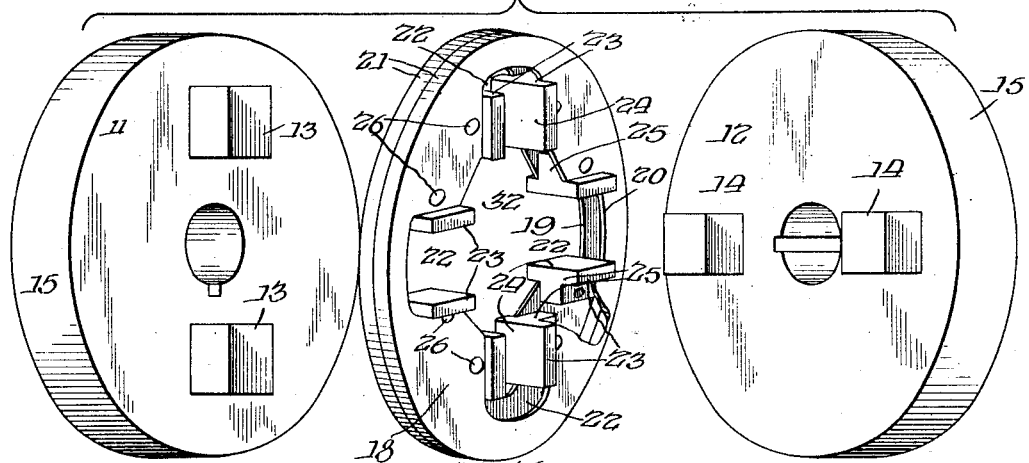
Inventor:
Marc A. Buettell Patented Nov. 8, 1932

1,887,081

UNITED STATES PATENT OFFICE

MARC A. BUETTELL, OF MISHAWAKA, INDIANA, ASSIGNOR TO DODGE MANUFACTURING CORPORATION, OF MISHAWAKA, INDIANA, A CORPORATION OF DELAWARE

COUPLING

Application filed January 2, 1932. Serial No. 584,240.

This invention relates to so-called flexible couplings, and among other objects aims to provide an improved power transmitting coupling which is efficient and strong yet simple in construction.

The invention may readily be understood by reference to an illustrative construction embodying the invention and shown in the accompanying drawing.

In said drawing:

Fig. 1 is a longitudinal axial section through a coupling connecting driving and driven shafts;

Fig. 2 is a perspective view showing the coupled and coupling elements in separated relationship;

Fig. 3 is a plan view of a coupling element; and

Fig. 4 is a transverse section of a different form of coupling element.

The illustrative coupling is designed to provide a driving connection between separate shafts and the like, capable of compensating for possible angular or parallel misalignment of the shafts or both without imposing substantial additional stresses on the shaft bearings or seriously reducing efficiency where the misalignment is substantial. As here shown the driving and driven shafts 10 have coupling flanges 11 and 12 provided with power transmitting elements in the form of integral pairs of lugs 13 and 14 which are in circumferential alignment. The coupling flanges, which are shown with integral rims 15 and hubs 16, are provided with keyways by means of which they may be keyed to the respective shafts where they are held against longitudinal movement by set screws 17.

Power is transmitted by the driving to the driven pairs of lugs by an interposed coupling element 18 which is freely movable or shiftable relative to each pair in order not to set up or transmit stresses resulting from either parallel or angular misalignment of the shafts. The coupling element is advantageously formed from sheet metal, such as sheet steel, shaped to provide a beam section (in this case channel section, see Fig. 1) in the region subjected to the power transmitting stresses, thereby securing maximum strength for a minimum weight of metal. As here shown the coupling element is formed from a plurality of flanged circular plates 19 and 20 whose flanges 21 are in register and form tension rims.

For the most commonly used units the plates are placed with their flanges edge to edge, thereby forming a structure whose section is of channel shape wherein the sides of the channel function as the webs of a beam to assume the driving stresses and the flanges cooperate to rigidify and stiffen the coupling element as well as to constitute a continuous circular tension rim which holds the element against distortion and serves to assume and distribute stresses within the coupling. The plates are provided with registering openings 22 to receive the opposite pairs of power transmitting lugs 13 and 14 (such pairs of openings being angularly spaced by 90°) with which are associated pairs of opposite bearing elements 23, preferably of some anti-friction or self-lubricating material, such as bakelite impregnated with graphite, spaced apart a distance equal to the thickness of the lugs. The bakelite blocks are advantageously somewhat resilient and this serves to some extent to absorb shocks and reduce noise. The bearing elements or blocks are provided with relatively wide faces 24 co-extensive in size with the bearing faces of the lugs and have integral shanks 25 which extend between the pairs of plates and serve as spacers to maintain the proper spacing between the plates at points inside their periphery. The bearing blocks are here shown seated against the plates at the edges of the openings 22 thereby to transmit pressure to the plates, and are fastened in place by relatively small rivets 26 which pass through registering openings of the blocks and plates and clamp the plates tightly together but are not intended to be subjected to any shear stresses. This connection in conjunction with the marginal flanges 21 serves sufficiently to rigidify and stiffen the plate webs against transverse distortion from the transmission of bending or radial stresses, and also permits the use of relatively thin sheet metal without sacrifice in strength. If desired, for the purpose of renewing the bearing blocks, the latter may be removably held in place by bolts instead of rivets.

As here shown the coupling members are assembled by first positioning the coupling element and then moving the shafts longitudinally into coupled relation. If the lugs 13 and 14 be removably bolted or attached to the flanges, it is possible to assemble the coupling elements by a lateral movement of the shafts. After approximate alignment has been effected, the lugs may be connected to their respective flanges.

The bearing faces of the power transmitting lugs 13 and 14 deliver forces to the bearing blocks 22 in a tangential direction, indicated for example by the dotted line 27, which is perpendicular to the face of the bearing block as well as the face of the driving lugs, thus insuring a uniform distribution of force over said faces and avoiding concentration of pressure on limited areas and consequent wear on the bearing blocks and driving lugs. The resistance offered by the driven lugs is likewise tangential in character and, as represented by the dotted line 28, is perpendicular to the faces of the bearing blocks and driven lugs, thereby likewise insuring a uniform distribution of pressure over the entire coacting faces of the bearing blocks and lugs. The resultant forces developed by the driving pressures (represented in direction by the lines 27) and the resistance to rotaton developed by the driven lugs (represented in direction by the dotted lines 28), is directed radially outwardly as indicated by the dotted lines 29. These resultant forces which represent the stresses imposed upon the coupling element itself, are located where the radial or web depth 30 of the plates 19 and 20 is greatest and best able to assume and transmit such stresses. Moreover they are located in imperforate regions of the coupling element, thereby avoiding concentration of stresses likely to develop fracture. The oppositely directed resultant forces of course are mutually balanced through the tension rim to which the forces are transmitted by the plate webs and by which the forces are distributed through the coupling.

If the rotation of the driving shaft be reversed, the same or similar stresses both as regards direction and amount will be imposed upon the transmitted by the regions 31 of the coupling elements which are similarly of maximum depth and imperforate in character.

The metal of the plates in these regions functions in transmitting and assuming stresses as the web of a beam which is rigidified against flexure and distortion by the flanges 21 and the rigid connection with the spacing shanks 25 of the bearing blocks. Preferably the plates 19 and 20 are cut out centrally at 32 to provide additional clearance for assembly, and to accommodate shafts whose ends project beyond their flanges into the region of the coupling element,—particularly since the metal in the central region would be subjected practically to no stresses and would serve no useful function.

It will be apparent from the foregoing that the illustrative type of coupling takes advantage of both the inherent high unit strength of rolled sheets and the ease of fabrication of sheet metal from which the coupling plates may be completely and cheaply formed by a simple operation. Moreover the use of sheet metal avoids the possibility of latent flaws likely to be present in cast or forged units. The smooth exterior presented by the coupling element makes housing unnecessary, since there are no projections which might catch on workmen's clothing.

A larger or stronger coupling element may be provided if necessary merely by assembling the same or similar plates 19 and 20, as shown in Fig. 4, wherein pairs of plates 33 and 34 are placed back to back and assembled with the inner flanges 35 and 36 in register. The shanks 37 of bearing blocks 38 are located between the inner plates and the entire structure is connected together by rivets or bolts 39 which pass through both pairs of plates and through registering openings in the bearing blocks. The transmission and location of stresses will of course be the same as shown in Fig. 3 except that the strength of the beam structure will be double that of the element shown in Figs. 1 to 3, and the beam shape will be that of a pair of T-shaped sections.

Since, as here shown, the driving and driven lugs are in circumferential alignment the forces transmitted lie in a plane perpendicular to the axis of the shafts, thus not creating any torsional or other forces to be transmitted to or sustained by the coupling element.

Obviously the invention is not limited to the details of the illustrative construction since these may be variously modified. Moreover it is not indispensable that all the features of the invention be used conjointly since various features may be used to advantage in different combinations and subcombinations.

Having described my invention, I claim:

1. A coupling element for the type of coupling described comprising in combination a pair of circular sheet metal plates having an integral continuous flanged rim, recesses in said plates for receiving driving and driven elements, said plates having webs of substantial depth for withstanding the forces transmitted by the coupling, and fastening means for holding said plates together.

2. A coupling element for the type of coupling described comprising in combination a pair of circular sheet metal plates having an integral continuous flanged rim, recesses in said plates for receiving driving and driven elements, said plates having webs of substantial depth for withstanding the forces transmitted by the coupling, and bearing members associated with said recesses for receiving and transmitting the forces carried by the element.

3. A coupling element for the type of coupling described comprising in combination a pair of spaced circular sheet metal plates having an integral continuous flanged rim, recesses in said plates for receiving driving and driven elements, said plates having webs of substantial depth for withstanding the forces transmitted by the coupling, bearing members located in said recesses and having shanks extending between said plates to space the same, and fasteners passing through said plates and shanks to hold the same rigidly together.

4. A coupling element for the type of coupling described comprising in combination pairs of circular plates located back to back and having flanged rims, the inner rims of each pair being in abutting register, pairs of recesses in said plates, bearing blocks in said recesses and having shanks extending between the inner two plates to hold the same against distortion, and fasteners passing through said plates and shanks to hold the plates in rigidly assembled relation.

5. A coupling element for the type of coupling described comprising in combination a circular member having a web and an integral continuous flanged rim, pairs of opposite recesses in said plate having bearing faces for receiving and transmitting the forces carried by the coupling, said pairs being arranged 90° apart, the portions of the web between said recess being of substantial depth to carry the forces transmitted by said lugs, and means for cooperating with the flanged rim to hold said web against lateral distortion in transmitting said forces.

6. In a shaft coupling of the type wherein confronting shaft members each having a pair of diametrically opposite lugs are coupled by an intermediate coupling element having pairs of recesses in cruciform relation receiving the respective pairs of lugs, the improved intermediate coupling element comprising a circular member of structural beam section having a web and a continuous flanged peripheral portion integral with the web, said member provided in the web portion thereof with said recesses, said recesses having walls rigid with and extending laterally of the web providing bearing faces for coaction with said lugs.

7. In a shaft coupling of the type wherein confronting shaft members each having a pair a diametrically opposite lugs are coupled by an intermediate coupling element having pairs of recesses in cruciform relation receiving the respective pairs of lugs, the improved intermediate coupling element comprising a circular member of structural beam section having a continuous channel-form peripheral portion and spaced webs integral with the side walls of said channel-form peripheral portion, said webs having registering openings providing the aforesaid recesses and connecting walls associated with said openings providing bearing faces for coaction with said lugs.

8. In a shaft coupling of the type wherein confronting shaft members each having a pair of diametrically opposite lugs are coupled by an intermediate coupling element having pairs of recesses in cruciform relation receiving the respective pairs of lugs, the improved intermediate coupling element comprising a circular member having spaced webs formed with continuous peripheral flanges in abutting registration and having registering openings providing the aforesaid recesses encircled by and spaced from said flanges, and flanged bearing blocks associated with said recesses for coaction with said lugs, said bearing blocks fitted between and rigidly united with the webs adjacent to said openings and having their flanges abutting corresponding edges of the webs.

9. A shaft coupling comprising a pair of members for attachment to the shafts to be coupled, each of said members having a pair of diametrically opposite lugs, and an interposed coupling element having a continuous peripheral portion and a central opening adapted to receive the end of either of said shafts, said opening having radiating branches in cruciform relation providing recesses, each pair of said lugs entering a pair of diametrically opposite recesses, the walls of said member in which said opening and branches are cut being integral with the peripheral portion which encircles said recesses.

10. A shaft coupling comprising a circular coupling element having a continuous peripheral portion, said element comprising a plurality of peripherally flanged circular sheet metal plates having recesses spaced from the periphery and arranged to provide radiating ways in cruciform relation within a region of the element encircled by said peripheral portion, and a pair of shaft members between which said element is interposed, each of said shaft members having a pair of lugs engaging diametrically opposite ways of said interposed coupling element.

11. A coupling element for the type of coupling described comprising a plurality of circular sheet metal plates having continuous peripheral portions and lug-receiving recesses spaced from the peripheries of the plates and provided with continuous circular reinforcing and tensioning ribs encircling said recesses.

12. A coupling element for the type of coupling described comprising a pair of circular sheet metal plates having continuous peripheral flanges in abutting registration and lug-receiving recesses encircled by and spaced from said flanges, and means associated with the webs of the plates at said recesses spacing the plates and providing bearing faces for coacting with driving lugs entering said recesses.

13. A coupling element for the type of coupling described comprising spaced circular sheet metal plates having continuous peripheral portions formed with continuous circular reinforcing and tensioning ribs and having lug-receiving recesses encircled by and spaced from said ribs, and flanged bearing blocks fitted between and fastened to the plates adjacent to said recesses and having their flanges abutting corresponding plate edges, said blocks arranged for coaction with driving and driven lugs entering said recesses.

14. A coupling element for the type of coupling described comprising a plurality of connected pairs of circular sheet metal plates having continuous peripheral flanges and registering recesses in cruciform relation encircled by and spaced from said flanges, each pair of plates arranged back to back and adjacent plates of said pairs having their said flanges in abutting registration.

15. A coupling element for the type of coupling described comprising a plurality of pairs of circular sheet metal plates having continuous peripheral portions formed to provide strengthening and tensioning ribs and having lug receiving recesses encircled by said peripheral portions, each pair of plates arranged back to back, and bearing blocks secured between adjacent pairs of plates and having flanges overlying the edges of said plates at said recesses, substantially as and for the purpose described.

In witness of the foregoing I affix my signature.

MARC A. BUETTELL.